United States Patent Office 3,714,255
Patented Jan. 30, 1973

3,714,255
ADDITION PRODUCTS OF NITROSYL HALIDES
AND CYCLIC UNSATURATED HYDROCARBONS
Jerome Robert Olechowski, Trenton, N.J., assignor to
Cities Service Company, New York, N.Y.
No Drawing. Filed Aug. 26, 1971, Ser. No. 175,332
Int. Cl. C07c *131/02, 81/00*
U.S. Cl. 260—566 A                    3 Claims

ABSTRACT OF THE DISCLOSURE

Nitrosyl halides are reacted with unsaturated cyclic hydrocarbons to obtain halo, nitroso cyclic saturated or unsaturated hydrocarbons. In one embodiment chloronitrosotrimethylcyclododecadiene is prepared by reacting nitrosyl chloride with trimethylcyclododecatriene. The reaction milieu, if sufficiently acidic, catalyzes the conversion of the chloronitrosotrimethylcyclododecadiene to chlorooximinotrimethylcyclododecadiene. The chlorooximinotrimethylcyclododecadiene is useful in the production of ketones by acid hydrolysis to obtain fragrance materials or is converted to a lactam by a Beckmann rearrangement. The lactam is reacted to obtain a polyamide useful in the manufacture of fibers, such as nylon, or molded articles, such as containers and the like.

---

The invention relates to the production of novel compositions of matter comprising halo, nitroso saturated and unsaturated cyclic hydrocarbons and halo, oximino saturated and unsaturated cyclic hydrocarbons as well as the process for obtaining such compositions. The oximino compositions are converted to the chloro ketones by acid hydrolysis, hydrogenated to the saturated ketone if necessary, or dehydrohalogenated to the unsaturated ketones and are useful as fragrances. The oximino compound is also converted to the corresponding lactam which is then converted to a polyamide.

Several methods are known in the prior art for the manufacture of lactams useful in the production of nylon. One process comprises nitrosating a cyclic monocarboxylic acid. The acid may be obtained by a two step process consisting of the carbonylation of a cyclic hydrocarbon by an oxo process to obtain the cyclic aldehyde followed by oxidation of the aldehyde to the acid. Different catalysts employed in the oxo and oxidation steps ordinarily require purification of the products obtained at each of these stages of the reaction so that the catalyst of one reaction won't interfere with the catalyst of the other reaction.

Furthermore, the oxo reaction is run at elevated temperatures and pressures. Special high pressure reaction vessels and handling techniques are required for operating this type of process.

The objects of the present invention are to provide novel compositions. Another object of the invention is to provide novel compositions which are useful in the manufacture of lactams. An additional object of the invention is to obtain such compositions by either a one step or two step process. It is also an object of the invention to obtain an intermediate composition which does not have to be purified in order to manufacture a composition which is ultimately converted to a lactam.

These and other objects are obtained according to the present invention by reacting a nitrosyl halide with an unsaturated cyclic hydrocarbon to obtain novel halo, nitroso saturated or unsaturated cyclic hydrocarbons which are either simultaneously or subsequently converted to halo oximino saturated or unsaturated cyclic hydrocarbons in the presence of either an acid or ultraviolet light. The acid employed to obtain the halo, oximino saturated or unsaturated cyclic hydrocarbons may be a hydrogen halide and/or the acidic environment obtained by nitrosyl halide reaction. If a hydrogen halide is employed, it may be added during or after the formation of the halo, nitroso saturated or unsaturated cyclic hydrocarbon.

In one embodiment chloronitrosotrimethylcyclododecadiene is prepared by reacting nitrosyl chloride with trimethylcyclododecatriene. The reaction may be sufficiently acidic to catalyze the conversion of the chloronitrosotrimethylcyclododecadiene to chlorooximinotrimethylcyclododecadiene. The chlorooximinotrimethylcyclododecadiene is hydrolyzed to the chloro ketone which is useful as a fragrance material or is converted to the lactam by a Beckmann rearrangement. The lactam is reacted to obtain a polyamide or nylon type of polymer useful in the manufacture of fibers or molded articles such as containers and the like.

The formation of the nitroso compound may be illustrated by the following:

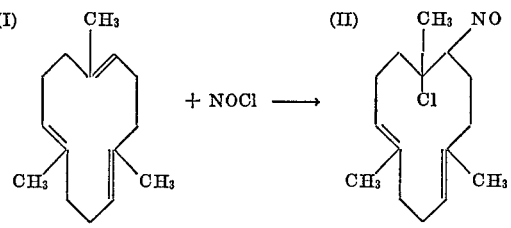

The nitroso compounds dimerize readily according to the following equilibrium reaction:

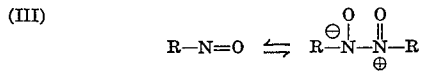

where R may be the chlorotrimethylcyclododecanyldiene radical of Formula II above.

Accordingly, because of the equilibrium established between the nitroso compound per se and its dimer, whenever used throughout the present specification and claims the expression "halo, nitroso saturated or unsaturated cyclic hydrocarbons" and specific compounds falling within this expression is intended to include both the compound per se as well as the dimer.

The halo, oximino saturated or unsaturated cyclic hydrocarbons obtained according to the present invention are formed during the production of the halo, nitroso saturated or unsaturated hydrocarbons most likely due to the decomposition of the nitrosyl halide to form an acid which catalyzes the reaction of the nitroso compound to the oximino compound. The following reaction illustrates the formation of such oximino compounds from the nitrosyl chloride addition products of trimethylcyclododecatriene:

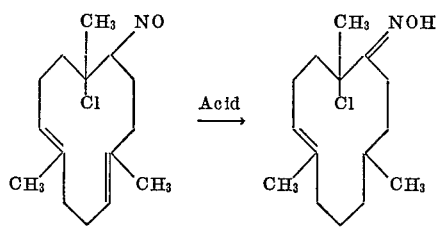

The foregoing production of oximino compounds is also catalyzed by ultraviolet light.

The cyclic hydrocarbon reacted with the nitrosyl halide may be any unsaturated cyclic hydrocarbon having up to about 12 ring carbon atoms and preferably contains up to about 3 carbon-to-carbon double bonds. Broadly speaking the unsaturated cyclic hydrocarbon in this respect may comprise those which are also substituted by lower alkyl groups, especially up to about three lower alkyl groups.

The preferred cyclic hydrocarbons contain 12 ring carbon atoms and from three to one, preferably three or one carbon-to-carbon double bonds. The most preferred unsaturated cyclic hydrocarbons in this respect also contain lower alkyl groups, especially up to about three lower alkyl groups. These cyclic hydrocarbons are for example 1,5,9-trimethylcyclododecatriene and 2,5,9-trimethylcyclododecatriene and mixtures thereof as well as 1,5,9-trimethylcyclododecene and 2,5,9-trimethylcyclododecene and mixtures thereof.

The halo and halide compositions referred to throughout the specification and claims are intended to be those derived from the halogens, chlorine, bromine and iodine, or any combination thereof. The preferred halogen is chlorine because the corresponding chloro and chloride compositions employed or obtained according to the present invention are either readily available or readily made, such as, for example, in the use of nitrosyl chloride and anhydrous hydrogen chloride for the production of chloronitrosotrimethylcyclododecadiene and chlorooximinotrimethylcyclododecadiene.

The nitrosyl halides which are used in the reaction with the unsaturated cyclic hydrocarbons may be chlorides, bromides or iodides or any combination thereof. For example, nitrosyl chloride or nitrosyl bromide may be used because of their availability, especially nitrosyl chloride which is easily obtained. It should also be noted that either cyanogen bromide or cyanogen chloride or combinations thereof can be employed to react with the unsaturated cyclic hydrocarbons to obtain the corresponding chloro or bromo cyano compounds which are hydrogenated to the amine and reacted with phosgene (carbonyl chloride) to obtain an isocyanate which is useful in the manufacture of urethane polymers, especially as chain terminating agents in the manufacture of urethanes from diisocyanates and diols such as toluene diisocyanate and polyethylene glycol. The isocyanates may also be converted to the alkyl or aryl, especially lower alkyl, carbamates which in turn may be used as insecticides.

The cyano compounds obtained in this respect comprise 1-chloro-2-cyano - 1,5,9 - trimethylcyclododeca-5,9-diene and 1-chloro-2-cyano-2,5,9-trimethylcyclododeca-5,9-diene. These compounds are converted into the urethanes and carbamates by the aforementioned methods.

The hydrogen halides employed in the conversion of the halo, nitroso saturated or unsaturated cyclic hydrocarbons to the corresponding oximino compounds may be hydrogen chloride, hydrogen bromide or hydrogen iodide. However, hydrogen chloride is preferred, especially anhydrous hydrogen chloride. The other hydrogen halides employed in this respect are preferably used as the anhydrous compounds as well. Ultraviolet light may also be used for the conversion of the aforementioned nitroso compound to the oximino compound.

The process of the present invention is conducted in the presence of a solvent, such as acetic acid or any of the one to about three carbon atom aliphatic acids or mixtures thereof, the one to about five carbon atom aliphatic alcohols or mixtures thereof, esters of the said acids and alcohols, mixtures of such esters, acetonitrile and aromatic solvents, such as, for example, benzene. Alkyl aromatic compounds are not employed as solvents since they tend to add the nitrosyl halide in the same manner as the unsaturated cyclic hydrocarbon and as such this side reaction interferes with the efficiency of the formation of the nitrosyl halide. Any mixture, especially the two or three component mixtures of solvents, may be used.

The solvents should be inert towards the reactants by which it is intended that any solvent may be employed which is empirically observed to dissolve the reactants and which does not enter into and/or does not adversely affect the process.

Time, temperature and pressure conditions for conducting the reaction are not critical. The temperature generally should be sufficiently high so that the reactants are dissolved in the solvent. For example, 10–15° C. temperatures are employed when acetic acid is used as the solvent. Temperatures of from about —5° C. to about 100° C. and pressures from about 0.5 atmos. to about 5 atmos. may be used. The reaction is conducted for a period of time sufficient to obtain a measurable yield of product. The pressure may be atmospheric which is an advantage over the aforementioned prior art processes which employ high pressure oxo reaction conditions to carbonylate the unsaturated cyclic hydrocarbons, the carbonylation products in turn being oxidized to acids which are nitrosated to the lactams. It can therefore be seen that by employing the method of the present invention that means are now available for obtaining lactams without the necessity of employing such high pressure reaction processes such as the oxo method.

The following examples are illustrative:

EXAMPLE 1

The following example illustrates a process for the simultaneous manufacture of chloronitrosotrimethylcyclododecadienes and chlorooximinotrimethylcyclododecadienes. One mole (204 grams) of trimethylcyclododecadienes which is 99.8% pure by vapor phase chromatomethylcyclododeca-1,5,9-triene and about 70% of 2,5,9-graphic analysis and consisting of about 30% of 1,5,9-trimethylcyclododeca-2,5,9-triene is dissolved in 400 milliliters of glacial acetic acid to obtain a mixture which is cooled to 10–15° C. after which 65.5 grams (1.0 mole) of nitrosyl chloride is added to maintain the temperature at 10–15° C. After the addition, the mixture is stirred for several hours to complete the reaction. It is observed upon initial addition of the nitrosyl chloride that the mixture took on a brilliant green color. When approximately one-half of the nitrosyl chloride had been added, a precipitate begins to form. Two products are obtained, the first being an initial precipitate and the second being the product recovered from the mother liquor of the first by evaporation.

Calculated for $C_{15}H_{22}NOCl$: Cl, 13.25%. Found for the initial product: Cl, 13.52%; melting point 109–125° C.; for the second product Cl, 13.74%, 13.81%; melting point, 121–129° C.

Infrared analysis of the initially precipitated product shows a strong band in the region of 1370 cm.$^{-1}$ characteristic of the chloro nitroso moiety. Oxime absorption is noted near the 3585 cm.$^{-1}$ band.

The second fraction referred to above shows similar infrared spectra. The different melting points obtained for each of the products indicates that the 1,5,9- and 2,5,9-isomers are obtained.

The products of the foregoing reaction comprise the chloronitrosotrimethylcyclododecatrienes, 1 - chloro-2-nitroso-1,5,9-trimethylcyclododeca-5,9-diene; 1-chloro-2-nitroso-2,5,9-trimethylcyclododeca-5,9-diene and the chlorooximinotrimethylcyclododecadienes, 1 - chloro-2-oximino-1,5,9-trimethylcyclododeca-5,9-diene; 1 - chloro-2-oximino-2,5,9-trimethylcyclododeca-5,9-diene.

EXAMPLE 2

When the process of Example 1 is repeated in the presence of anhydrous hydrogen chloride, the oximino products as described in Example 1 are obtained in higher yields.

EXAMPLE 3

When the process of Example 1 is repeated and the reaction mixture exposed to ultraviolet light, oximino products as described in Example 1 are obtained in higher yields.

EXAMPLE 4

The method of Example 1 is repeated. However, 1,5,9-trimethylcyclododecene admixed with 2,5,9-trimethylcyclododecene in an approximate 70:30 ratio respectively is employed in place of the trimethylcyclododecatrienes.

The products obtained by this example are analogous to those obtained in Example 1 and comprise the chloronitrosotrimethylcyclododecanes and the chlorooximinotrimethylcyclododecanes, 1-chloro-2-nitroso-1,5,9-trimethylcyclododecane; 1-chloro-2-nitroso-2,5,9-trimethylcyclododecane; 1-chloro-2-oximino-1,5,9-trimethylcyclododecane and 1-chloro-2-oximino-2,5,9-trimethylcyclododecane.

The halo, nitroso saturated or unsaturated cyclic hydrocarbons obtained according to the present invention are useful as intermediates in the formation of the corresponding halo, oximino saturated or unsaturated hydrocarbons, the latter being converted to the halo ketones by acid hydrolysis. Hydrogenation of these products in turn give the saturated ketones which are useful as fragrance materials. Dehydrohalogenation of the halo ketones yields unsaturated ketones which are also of importance in fragrance and flavor applications.

The oximino saturated or unsaturated cyclic hydrocarbons are also used as intermediates in the formation of the corresponding lactams. Thus, 1-chloro-2-oximino-1,5,9-trimethylcyclododeca-5,9-diene; 1-chloro-2-oximino-2,5,9-trimethylcyclododeca-5,9-diene; 1-chloro-2-oximino-1,5,9-trimethylcyclododecane and 1-chloro-2-oximino-2,5,9-trimethylcyclododecane are converted to the corresponding lactam by a Beckman rearrangement employing liquid $SO_2$ and $SOCl_2$ at temperatures of about $-10°$ to about $-15°$ C.

The lactams obtained are then heated according to methods known in the prior art in order to convert them into polyamides which are useful in the manufacture of fibers and molded articles such as containers and the like. Mixtures of lactams such as the $C_{12}$ and $C_6$ lactams with the lactams prepared according to the present invention may be used in order to obtain copolymers of the polyamides, the copolymers of polyamides being useful in fiber applications as well as for the manufacture of a molded article such as containers and the like. The fibers noted herein in turn are employed in the manufacture of knit, woven or non-woven fabrics.

When all the foregoing equivalent reaction conditions and reactants which are described are employed, the same general results are obtained as noted herein. Several of the equivalent conditions and reactants have been described broadly by reference to ranges of equivalents, by which it is intended that such ranges are to include specific values between the upper and the lower limits thereof as well as narrower ranges within the broad range disclosed. Thus, for example, where the temperature range is given for the reaction as within the limits of 10–15° C., any specific value, e.g., 11°, 12° C., etc. falling within this range is also intended as well as a narrower range within this broad range, e.g., 12–14° C. Furthermore, where the hydrocarbon for example has been described, preferably as one containing up to about 12 ring carbon atoms, it is intended to include those hydrocarbons which can be described by a narrower range such as hydrocarbons having from about 6 to about 12 or about 8 to about 12 ring carbon atoms, and so forth for the other numerical ranges used to define the various equivalents. The various conditions and reactants described as being suitable for the present invention are used in any combination with one another.

Although the invention has been described by reference to certain embodiments, it is not intended that the novel compositions of matter and process be limited thereby but that certain modifications are intended to be included within the broad spirit and scope of the foregoing disclosure and the following claims.

I claim:

1. A compound selected from the group consisting of chloronitrosotrimethylcyclododecane and chlorooximinotrimethylcyclododecane.

2. The compound of claim 1 comprising chloronitrosotrimethylcyclododecane.

3. The compound of claim 1 comprising chlorooximinotrimethylcyclododecane.

References Cited

UNITED STATES PATENTS

| | | | |
|---|---|---|---|
| 3,205,263 | 9/1965 | Stansbury, Jr. et al. | 260—647 X |
| 3,293,301 | 12/1966 | Derfer et al. | 260—647 X |
| 3,303,217 | 2/1967 | Genas et al. | 260—566 A |
| 3,517,047 | 6/1970 | Ohono et al. | 260—647 X |

FOREIGN PATENTS

| | | | |
|---|---|---|---|
| 419,300 | 5/1966 | Japan | 260—566 A |
| 419,301 | 5/1966 | Japan | 260—566 A |

LELAND A. SEBASTIAN, Primary Examiner

U.S. Cl. X.R.

260—647; 204—162 XN